United States Patent
Mahalek et al.

(10) Patent No.: US 6,223,467 B1
(45) Date of Patent: May 1, 2001

(54) MOTOR VEHICLE SENSOR ARRANGEMENT FOR DETECTING JAMMING

(75) Inventors: Josef Mahalek, Kirchheim (DE); Bogdan Serban, Niederkon; Michel Witte, Luxembourg, both of (LU)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 08/801,862

(22) Filed: Feb. 18, 1997

Related U.S. Application Data

(63) Continuation of application No. PCT/EP95/03293, filed on Aug. 18, 1995, and a continuation of application No. PCT/EP95/03292, filed on Aug. 18, 1995.

(30) Foreign Application Priority Data

Aug. 18, 1994 (DE) ................................. 44 29 325
Aug. 18, 1994 (DE) ................................. 44 29 323

(51) Int. Cl.$^7$ ..................................... H01H 3/16
(52) U.S. Cl. ................ 49/27; 49/26; 49/28; 180/271; 180/279; 180/281; 180/286; 200/61.41
(58) Field of Search ................... 49/26, 27, 28; 180/271, 279, 281, 286; 200/61.41, 61.43; 73/865.9

(56) References Cited

U.S. PATENT DOCUMENTS

| | | | |
|---|---|---|---|
| 3,465,476 | * 9/1969 | Rayner et al. | 49/28 |
| 3,830,018 | 8/1974 | Arai et al. | |
| 4,115,952 | * 9/1978 | French | 49/26 |
| 4,301,337 | 11/1981 | Eventoff . | |
| 4,314,228 | 2/1982 | Eventoff . | |
| 4,315,238 | 2/1982 | Eventoff . | |
| 4,532,388 | * 7/1985 | Sackmann et al. | 200/61.43 |
| 4,773,183 | * 9/1988 | Okushima et al. | 49/28 |
| 5,051,672 | * 9/1991 | Yaguchi | 318/469 |
| 5,072,080 | 12/1991 | Beckhausen . | |
| 5,166,586 | * 11/1992 | Yaguchi | 318/434 |
| 5,296,658 | * 3/1994 | Kramer et al. | 49/28 |
| 5,404,673 | * 4/1995 | Takeda et al. | 49/28 |
| 5,459,962 | * 10/1995 | Bonne et al. | 200/61.43 |
| 5,592,060 | * 1/1997 | Racine et al. | 200/61.43 |
| 5,621,290 | * 4/1997 | Heller et al. | 49/28 |

* cited by examiner

Primary Examiner—Eric S. McCall
(74) Attorney, Agent, or Firm—Evenson, McKeown, Edwards & Lenahan, P.L.L.C.

(57) ABSTRACT

A motor vehicle sensor arrangement which is used to detect jamming, i.e, an obstruction, at a movable vehicle part which can be moved into an end position, such as an electric window, a sliding and tilting roof, a convertible top, or a servo-actuated door. A cavity defined by opposing resilient walls is located proximate, but outside, the path of movement of the movable vehicle part and at a selected distance from the end position. A distance sensor, for example a pressure transducer, is arranged in the cavity between the resilient walls. When an object obstructs the path of movement of the movable vehicle part toward the end position, the resilient walls are moved toward each other. When the distance sensor contacts a portion of the opposing resilient wall, the distance sensor actuates a response signal indicating a jam. Preferably the distance sensor is mounted on one of the resilient walls approximately facing the direction in which the movable vehicle part moves toward the end position, while a projection extending toward the distance sensor is provided on the opposite resilient wall. The projection substantially reduces the travel distance to actuate the jamming signal, since the distance between the distance sensor and the projection is substantially shorter than the distance between the two opposing resilient walls.

7 Claims, 2 Drawing Sheets

MOTOR VEHICLE SENSOR ARRANGEMENT FOR DETECTING JAMMING

CROSS-REFERENCE TO RELATED APPLICATIONS

This application is a continuation of PCT Application No. PCT/EP95/03293, filed on Aug. 18, 1995, and PCT Application No. PCT/EP95/03292 filed on Aug. 18, 1995.

BACKGROUND AND SUMMARY OF THE INVENTION

The present invention is directed to a motor vehicle sensor arrangement which is used to detect jamming, i.e., an obstruction, at a movable vehicle part which can be moved into an end position.

This application claims the priority of German Patent Application No. 44 29 325.9 filed on Aug. 18, 1994 and PCT Application No. PCT/EP95/03293 filed on Aug. 18, 1995, and German Patent Application No. 44 29 323.2 filed on Aug. 18, 1994 and PCT Application No. PCT/EP95/03292 filed on Aug. 18, 1995, the disclosures of which are expressly incorporated by reference herein.

Various sensors for detecting jamming are known. Frequently, information about a possible occurrence of jamming is collected from the performance data of an electric-motor drive unit for the movable vehicle part. The motor current or the torque delivered by the motor increases sharply when the movable vehicle part is jammed. These sensors may have problems, especially during prolonged operation, due to possible mechanical friction phenomena between the movable vehicle part and a typical mechanical guide which guides the movable vehicle part. Under these conditions, the sensors have difficulty distinguishing an actual case of jamming due to an obstruction from the normal operating state.

Mechanical transducers are also known that are incorporated in particular in a gasket against which the movable vehicle part presses in its end position. In such cases, for example, surfaces with a capacitive effect are placed against one another, and the distance between them changes if jamming occurs, i.e., if an object obstructs the movement of the movable vehicle part into its end position. The problem here is to distinguish between actual jamming by an obstructing object and the unobstructed entry of the door into its end position, when the same effect occurs. In the event of jamming, it is necessary to shut off an electric motor drive unit abruptly or even to reverse its direction of motion. If this were to be done, the movable vehicle part would always be stopped or reversed before reaching its final prescribed end position, which requires a partial deformation of the elastic gasket.

An object of the present invention is to provide a sensor device of the initially-described type which detects jamming reliably and dependably and which initiates the required emergency measures quickly and dependably only in such cases.

This and other goals have been achieved according to the present invention by providing a motor vehicle sensor arrangement for detecting jamming of an obstructing body at a movable vehicle part that is movable along a path into an end position, comprising: a pair of opposing walls spaced at a distance in an undeformed position to define a cavity therebetween, the cavity being located proximate but outside of the path of the movable vehicle part, at least one of the walls being formed of a resilient material, the distance between the walls being reduced when the obstructing body is engaged by the movable vehicle part; and a distance sensor arranged in the cavity and engageable with an interior portion of one of the walls to actuate a response signal, a distance between the distance sensor and the interior portion being less than the distance between the walls.

This and other goals have also been achieved according to the present invention by providing a motor vehicle sensor arrangement for detecting an obstruction at a movable vehicle part which is movable in a closing direction along a closing path into an end position, comprising: a resilient body arranged between a fixed vehicle structure and a resilient cover which is movable toward the fixed vehicle structure, one end of the cover being located proximate, but outside of, the closing path of the movable vehicle part, the one end of the cover being movable in the closing direction, the resilient body including a pair of opposing walls spaced at a first distance in an undeformed position to define a cavity therebetween; and a pressure transducer arranged in the cavity adjacent one of the walls, a projection arranged in the cavity on the other of the walls, the projection being aligned with and extending toward the pressure transducer, spaced by a second distance, much less than the first wherein an obstructing body which obstructs the closing path when the movable vehicle part is moved toward the end position is brought into contact with the one end of the cover, the movable vehicle part moving the obstructing body and the one end of the cover in the closing direction toward the fixed vehicle structure, the opposing walls being squeezed between the cover and the fixed vehicle structure, moving the pressure transducer into contact with the projection in order to actuate a response signal.

According to the present invention, the distance sensor/pressure transducer and its actuating mechanism are decoupled spatially. This allows a variety of different designs that make it possible to adapt the sensor device to various desired applications.

According to the present invention, the sensor arrangement is not located in the path of movement of the movable vehicle part, for example when the movable vehicle part is in its end position against a gasket. By mounting the sensor arrangement proximate, but outside, the path of movement of the movable vehicle part, the cavity is deformed only when an object obstructs the movement of the movable vehicle part toward its closed position. The deformation is caused by the action of the drive unit of the movable vehicle part on the jammed object. Normally the cavity remains in an undeformed position during the entire movement of the movable vehicle part into its end position, when no obstruction is encountered.

According to one preferred embodiment of the present invention, a projection is arranged in the cavity on one of the walls of the cavity, and extending toward the distance sensor/pressure transducer. As a result of the interaction between the distance sensor/pressure transducer and the projection of the cavity, the travel distance required for the pressure transducer to respond is advantageously reduced. By altering the size of the projection and/or the distance between opposite walls of the cavity, the travel distance between the distance sensor/pressure transducer and the projection can be adjusted in order to variably set the travel distance depending upon the application and the desired response characteristics. This travel distance can vary between zero (if the distance sensor/pressure transducer contacts the projection or the opposite wall) and the distance between the pressure transducer and the opposite wall (if no projection is provided on the opposite wall). In this way, it is also possible to compensate for mechanical tolerances. As a result of the interaction between the projection with the pressure transducer, the response characteristics of the pressure transducer, in other words the change of its output signal, can be adapted to the individual application conditions, depending upon the magnitude of the force to be detected and the triggering distance. The term "triggering distance" is the distance that the projection must travel for the critical signal change to occur in the pressure transducer.

The invention can be used at various locations in a motor vehicle. These include, for example, electrically operated windows, a sliding and tilting roof, a convertible top, or a door that is moved with servo support from a prelocked position into a locked position.

According to the present invention, a motor vehicle sensor arrangement is provided which can be simply installed, may be removed, and is simple to manufacture. Furthermore, the present invention significantly reduces the response travel of the distance sensor/pressure transducer. In addition, the present invention advantageously concentrates movement in the distance sensor/pressure transducer area. Finally, the present invention advantageously reduces the response distance between the distance sensor/pressure transducer and the engaging projection.

Other objects, advantages and novel features of the present invention will become apparent from the following detailed description of the invention when considered in conjunction with the accompanying drawings.

DETAILED DESCRIPTION OF THE DRAWINGS

Figure 1:
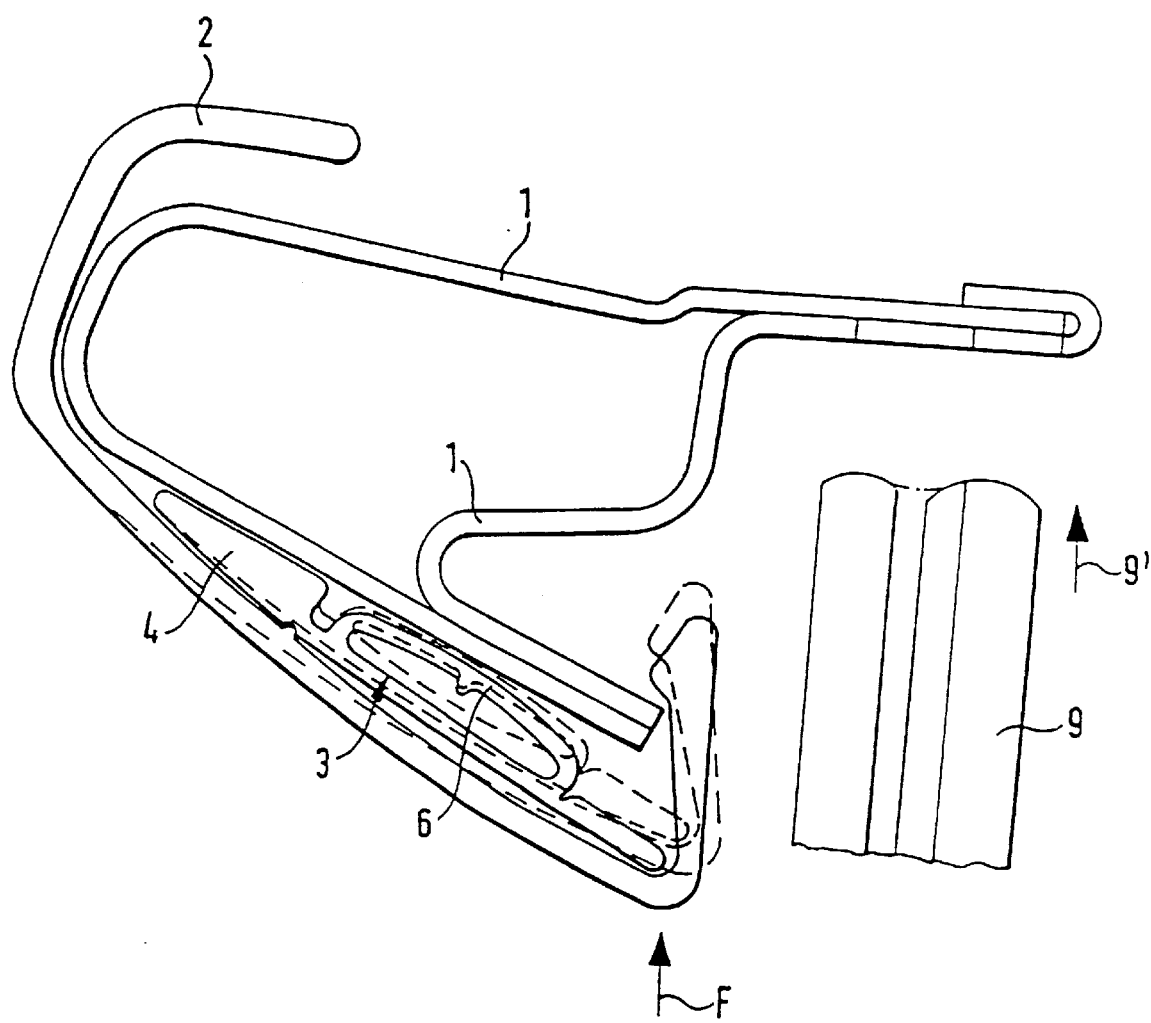
FIG. 1 is a cross section through a motor vehicle sensor arrangement according to a preferred embodiment of the present invention.
Figure 2:
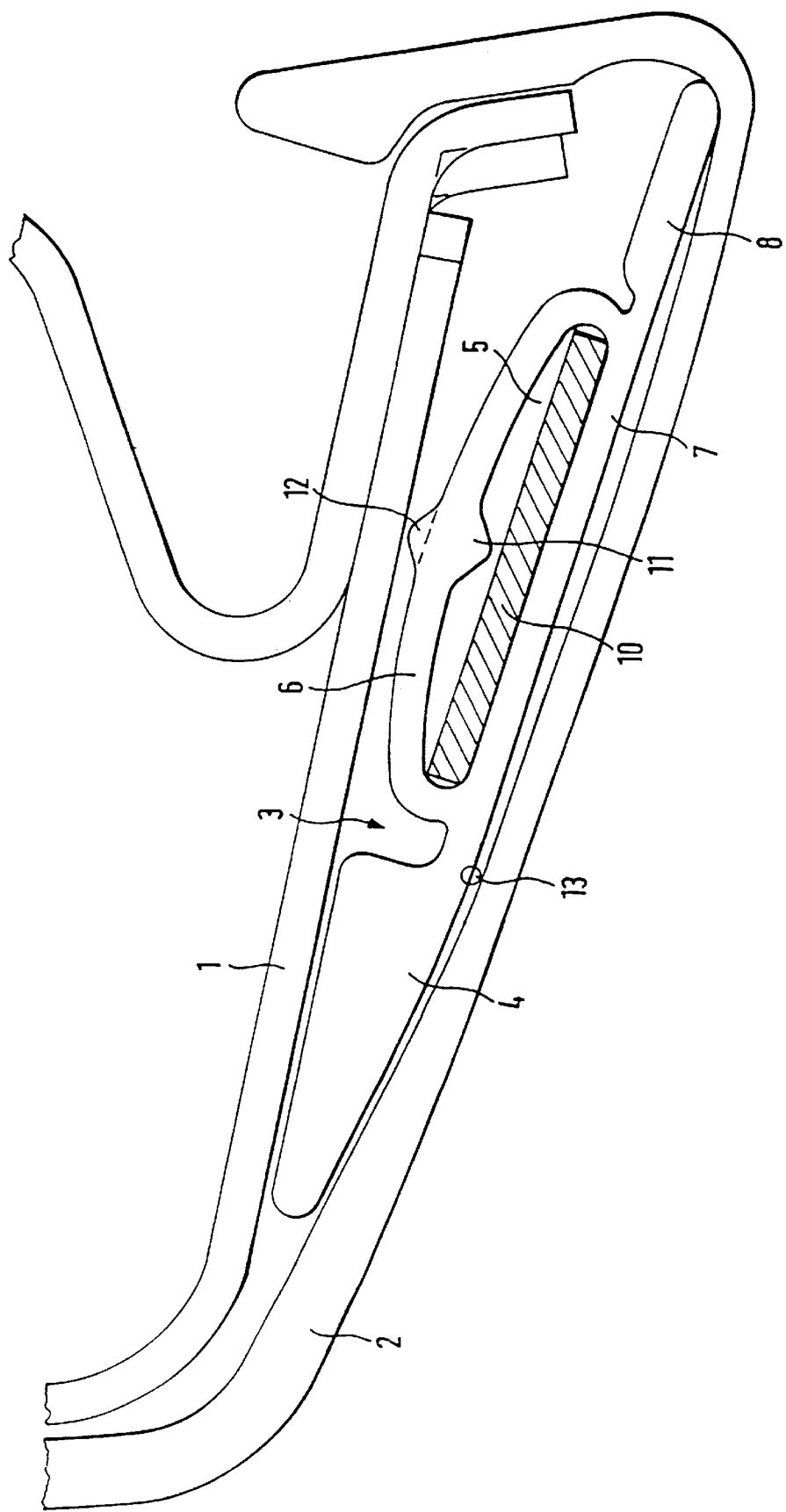
FIG. 2 shows a motor vehicle sensor arrangement according to another preferred embodiment of the present invention, having oppositely facing projections.

Referring to FIG. 1, a fixed vehicle structure, which in the illustrated embodiment is a door frame 1, is arranged with a flexible cover panel 2 covering the door frame 1. A body made of elastic or resilient material is arranged between the frame 1 and the panel 2, as best seen in FIG. 2. The body 3 consists of a wedge-shaped section 4 and a cavity 5 defined by opposite walls 6 and 7 spaced a first distance apart in an undeformed position. An end piece 8 holds the body 3 in the position indicated.

Frame 1 serves as a stop for a window pane 9 movable in the direction of arrow 9' by an electric motor. In the end position of the pane 9 abutting the frame 1, a gasket, not shown, is disposed between the pane 9 and the frame 1.

A pressure transducer 10 made, for example, in the form of a foil pressure sensor is arranged inside the cavity 5. A sensor of this kind is known from U.S. Pat. No. 4,301,337, U.S. Pat. No. 4,314,228, and U.S. Pat. No. 4,315,238, the disclosures of which are incorporated by reference herein. The wall 6 has an inwardly directed projection 11 that tapers to a point and extends toward the pressure transducer 10, spaced apart by a second distance, much less than the first, as well as an outwardly directed projection 12 that supports the cavity 5 against frame 1.

Normally the pane 9 enters its end (closed) position abutting the frame 1 and is held there after the drive stops. As a result of the reversal of the motion, the pane 9 is moved opposite the direction of arrow 9' into an open position. If raising the window results in jamming, i.e., contact with an obstructing body, the obstructing body is pressed by the pane 9 against the contact point F on the cover panel 2. The obstructing body may be, for example, the hand of an occupant of the vehicle. As a result of the intrinsic resilience or elasticity of the cover panel 2, the cover panel is pivoted upward and assumes, for example, the position indicated by the dashed lines. Since the frame 1 is rigid, the distance between the cover panel 2 and the frame 1 is reduced. Due to the projection 12, the upward movement of the wall 6 is limited while the wall 7 and likewise the pressure transducer 10 continue moving. Finally, the projection 11 presses into the surface of the pressure transducer 10 whose output signal is significantly modified as a result. For example, the resistance value of the foil pressure sensor employed in this case can be used as the output signal. The output signal may, in this case, stop or reverse the electric motor which is raising the window pane 9, preventing damage to the window pane, and/or the obstructing body.

The cover panel 2 is moved in the manner described only when jamming, i.e., an obstruction of the closing path of the window pane 9, occurs. Normally, the cover panel remains in the initial position shown in solid lines. As a result of the design of the projections 11, 12, the distance of these projections from the interior door panel or the surface of the pressure transducer 10, and the characteristic response curve of the pressure transducer 10, different travel distances corresponding to specific requirements can be set before the pressure transducer 10 responds. If it is desired to react as quickly as possible to jamming at a relatively low level of force, the distance between the projection 11 and the surface of the pressure transducer 10 can be kept as small as possible. The contour of the projection 11 can be as large as possible within the possibilities of manufacturing technology. Finally, the response sensitivity can also be influenced by the characteristic curve of the pressure transducer 10. Transducers of this kind are known in which a sharp change in their total resistance occurs even when a low pressure is applied to the surface, such changes then being easily detected by electronic circuits connected on the consumer side.

Additional factors that influence the characteristic curve of the sensor device according to the invention include the resilience or elasticity of the cover panel 2 and the shape of the wedge 4, especially its extent inside the space between the frame 1 and the cover panel 2. By means of the wedge 4, a bearing point 13 is created approximately at the transition point to the cavity 5, around which point the cover panel 2 and the cavity 5 can pivot. The interplay between the various factors allows the characteristic curve of the sensor device to be varied within wide limits and adapted to the specific installation conditions as well as the triggering criteria for safety measures related thereto, in this case stopping or reversing the motion of the window drive when an obstructing body is in the closing path of the window.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A motor vehicle sensor arrangement for detecting an obstruction at a movable vehicle part which is movable along a path into an end position, comprising:

a pair of opposing walls spaced at a first distance in an undeformed position to define a cavity therebetween, said cavity being located proximate said path of the movable vehicle part, at least one of said walls being formed of a resilient material; and a pressure transducer arranged in said cavity on one of said walls, said pressure transducer being engageable with a projection on the other of the walls to actuate a response signal, said pressure transducer and said projection being spaced at a second distance when in said undeformed position, said second distance being substantially less than said first distance.

2. A motor vehicle sensor arrangement according to claim 1, wherein said pressure transducer is insertable into a channel that runs inside said cavity.

3. A motor vehicle sensor arrangement according to claim 2, wherein said projection tapers to a point.

4. A motor vehicle sensor arrangement according to claim 2, wherein an additional projection is provided on an exterior side of said one of the walls, said additional projection being aligned opposite said first projection.

5. A motor vehicle sensor arrangement according to claim 1, wherein a supporting wedge is located adjacent to said cavity, said wedge serving as a pivot point for the movement of one of said walls.

6. A motor vehicle sensor arrangement according to claim 5, wherein said supporting wedge is made in one piece with said pair of opposing walls defining said cavity.

7. A motor vehicle sensor arrangement for detecting an obstruction at a movable vehicle part which is movable in a closing direction along a closing path into an end position, comprising:

a resilient body arranged between a fixed vehicle structure and a resilient cover which is movable toward said fixed vehicle structure, one end of the cover being located proximate, but outside of, said closing path of the movable vehicle part, said one end of the cover being movable in said closing direction, said resilient body including a pair of opposing walls spaced at a first distance in an undeformed position to define a cavity therebetween; and a pressure transducer arranged in said cavity adjacent one of said walls, a projection arranged in said cavity on the other of said walls, said projection being aligned with and extending toward said pressure transducer, said pressure transducer and said projection being spaced at a second distance when in said undeformed position, said second distance being substantially less than said first distance;

wherein an obstructing body which obstructs said closing path when said movable vehicle part is moved toward said end position is brought into contact with said one end of the cover, said movable vehicle part moving said obstructing body and said one end of the cover in said closing direction toward said fixed vehicle structure, said opposing walls being squeezed between said cover and said fixed vehicle structure, moving said pressure transducer into contact with said projection in order to actuate a response signal.

* * * * *